(12) United States Patent
Dierberger

(10) Patent No.: US 9,587,832 B2
(45) Date of Patent: Mar. 7, 2017

(54) STRUCTURES WITH ADAPTIVE COOLING

(75) Inventor: James A. Dierberger, Hebron, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 2003 days.

(21) Appl. No.: 12/286,705

(22) Filed: Oct. 1, 2008

(65) Prior Publication Data
US 2010/0077764 A1    Apr. 1, 2010

(51) Int. Cl.
F23R 3/06 (2006.01)
F23R 3/04 (2006.01)
F23R 3/00 (2006.01)

(52) U.S. Cl.
CPC ............ *F23R 3/04* (2013.01); *F23R 3/002* (2013.01); *F23R 2900/03044* (2013.01); *Y02T 50/67* (2013.01); *Y02T 50/675* (2013.01)

(58) Field of Classification Search
CPC .... F23R 3/002; F23R 3/04; F23R 3/06; F23R 2900/03044; F02K 9/64
USPC .......... 60/265, 266, 752, 754, 755, 757, 765
See application file for complete search history.

(56) References Cited

U.S. PATENT DOCUMENTS

| | | | | |
|---|---|---|---|---|
| 4,064,300 | A * | 12/1977 | Bhangu | 428/120 |
| 4,838,030 | A | 6/1989 | Cramer | |
| 5,131,222 | A * | 7/1992 | Auxier et al. | 60/204 |
| 5,209,059 | A * | 5/1993 | Ward | 60/766 |
| 5,279,127 | A * | 1/1994 | Napoli | 60/754 |
| 6,640,546 | B2 | 11/2003 | Lee | |
| 6,749,396 | B2 * | 6/2004 | Barry et al. | 415/115 |
| 6,761,031 | B2 | 7/2004 | Bunker | |
| 6,978,618 | B2 | 12/2005 | Pacheco-Tougas | |
| 7,059,133 | B2 | 6/2006 | Gerendas | |
| 7,093,439 | B2 | 8/2006 | Pacheco-Tougas | |
| 7,140,185 | B2 | 11/2006 | Bard | |
| 7,849,694 | B2 * | 12/2010 | Dahlke et al. | 60/756 |
| 2003/0182942 | A1 | 10/2003 | Gerendas | |
| 2004/0083734 | A1 * | 5/2004 | Kendall et al. | 60/752 |
| 2007/0125093 | A1 * | 6/2007 | Burd et al. | 60/804 |
| 2007/0144178 | A1 * | 6/2007 | Burd et al. | 60/753 |

FOREIGN PATENT DOCUMENTS

EP 1351022 A2 10/2003
WO WO 2005019730 A1 * 3/2005 ............... F23R 3/00

OTHER PUBLICATIONS

European Office Action for Application No. 09 252 317.4-1605; Date of Mailing: Apr. 20, 2016; 6 pgs.
English Abstract for EP1351022A2—Oct. 8, 2003; 1 pg.

* cited by examiner

*Primary Examiner* — William H Rodriguez
(74) *Attorney, Agent, or Firm* — Cantor Colburn LLP

(57) ABSTRACT

Disclosed are exemplary structures with adaptive cooling and methods of adaptively cooling structures. A liner is affixed to a support and the liner deflects away from the support when exposed to a localized hot spot in a hot fluid stream. The liner deflection creates a chamber between the liner and support, allowing cooling air to impinge against the liner, thus mitigating the effects of the hot spot. By providing impingement cooling only where needed, the amount of air needed for cooling is reduced.

15 Claims, 4 Drawing Sheets

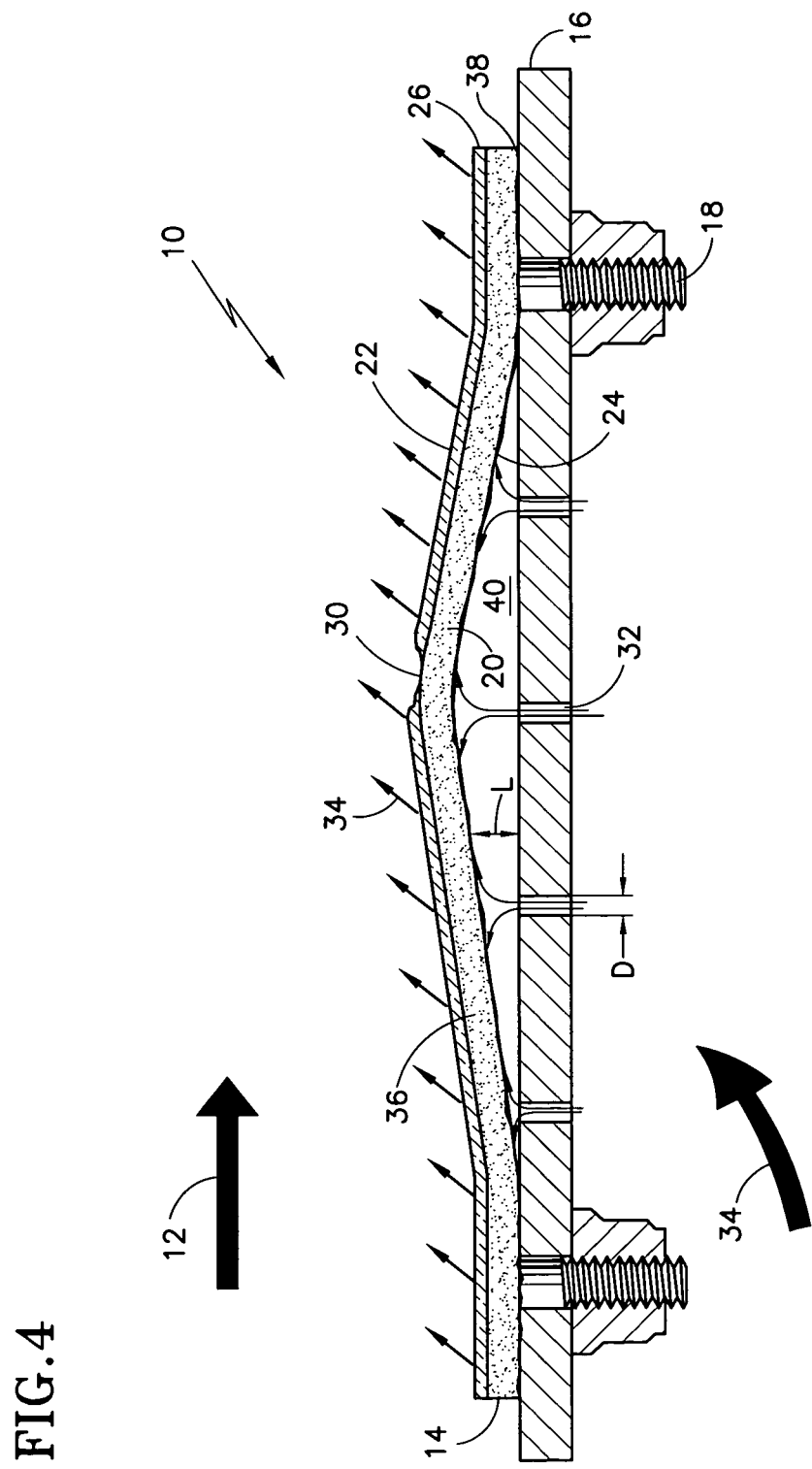

STRUCTURES WITH ADAPTIVE COOLING

BACKGROUND OF THE INVENTION (1) Field of the Invention

This disclosure generally relates to cooled structures and more specifically to structures with adaptive cooling for use in hot environments such as found in gas turbine engines.

(2) Description of the Related Art

Gas turbine engines are used for powering military and commercial aircraft, ships and electrical generators. Turbine engines operate according to a continuous Brayton cycle where a compressor pressurizes incoming air, fuel is added and the mixture is ignited in a combustor to produce a flowing stream of hot gas. The hot gas is referred to as gas path air or primary air. The gas path air is compressed, used for combustion, and then expands through a turbine before exiting the engine as thrust. The turbine extracts energy from the gas path air and, in turn, powers the compressor via a common shaft. Some military applications may introduce fuel in an augmentor downstream of the turbine, where it is also ignited to increase thrust. Many gas turbine engine architectures are known in the art and this primer is provided merely as an overview.

A portion of the pressurized gas path air is bled from the compressor and bypasses the combustion process altogether. This air is referred to as cooling air or secondary air and is used to cool components in the engine that are in direct contact with the hot gas path air. In most instances, the temperature of the gas path air exceeds the melting temperatures of the combustor, turbine and augmentor components' base material, so cooling is indispensable.

Designers determine the volume of cooling air required to cool these components using computer models, rig simulations and engine tests. Unfortunately, the gas path air temperature tend to vary spanwisely and circumferentially around the engine at constant axial locations. Also, local hot spots can develop in the gas path air due to shifts in aerodynamics, hardware deterioration, cooling passage clogging and other such causes. It's often difficult for designers to predict where these local hot spots will occur, so surplus cooling air volume is provided to ensure adequate cooling margin exists everywhere, to mitigate the effects of a localized hot spot should one occur. An example of a combustor heat shield with adequate cooling margin is disclosed in U.S. Pat. No. 7,140,185 to United Technologies Corporation.

Brayton cycle efficiency generally improves with an increase in gas path air temperature and a decrease in cooling air volume. By providing excess cooling air where it is not actually required, cycle efficiency is reduced. What is needed is a structure with adaptive cooling so that only the optimal volume of cooling air is used and cycle efficiency is improved.

BRIEF SUMMARY OF THE INVENTION

In accordance with the present invention, exemplary structures with adaptive cooling and methods of adaptively cooling such structures are provided.

In an exemplary structure, a mounting support includes a coolant aperture for directing a coolant through the support. A liner is mounted to the support, the liner includes a wall having a hot surface facing away from the support and a cold surface contacting the support in an average temperature location. The liner wall deflects away from the support in a hot spot location, forming a chamber between the cold surface and the support. The deflection allows the coolant to impinge on the cold surface of the liner to mitigate the effects of the hot spot.

In an exemplary method, a coolant is introduced into a coolant aperture in a support and is directed into a channel between the support and a liner without impinging the coolant against the liner in an average temperature location. The liner deflects away from the support to form a chamber between the liner and support in a hot spot location. The coolant impinges against the liner to mitigate the effects of the hot spot.

These and other objects, features and advantages of the present invention will become apparent in view of the following detailed description and accompanying figures of multiple embodiments, where corresponding identifiers represent like features between the various figures.

BRIEF DESCRIPTION OF THE SEVERAL VIEWS OF THE DRAWINGS

FIG. 4 illustrates a sectional view of an alternate cooled structure also taken along line 3-3 of FIG. 1.

DETAILED DESCRIPTION OF THE INVENTION

Figure 1:
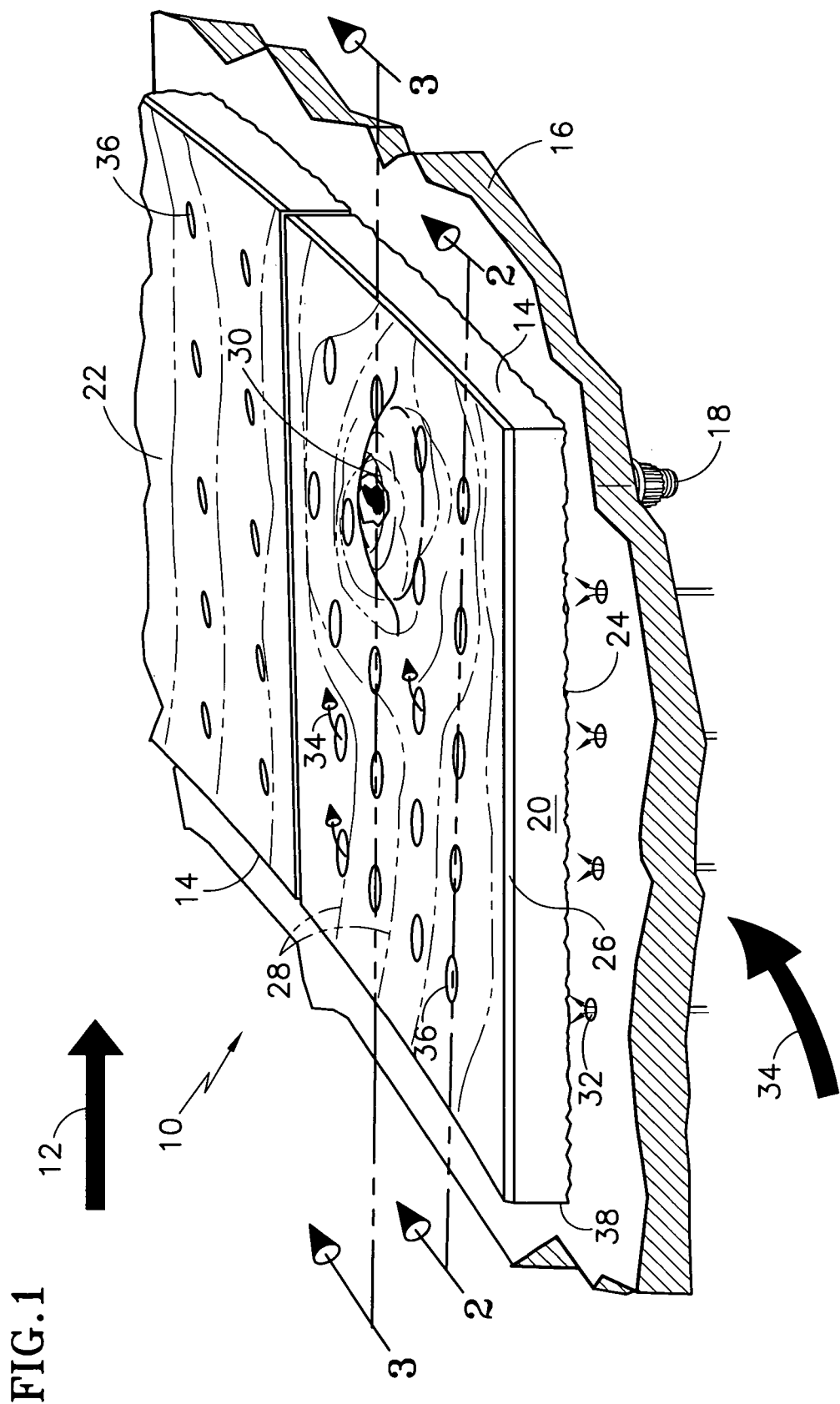
FIG. 1 illustrates a partial isometric view of a cooled structure in accordance with an exemplary embodiment of the present invention.

Referring first to FIG. 1, an exemplary structure 10 with adaptive cooling, such as a gas turbine combustor heatshield or augmentor liner for example, is exposed directly to hot gas path air 12. A liner 14 is affixed to a mounting support 16 by fastening means 18 such as threaded studs, bolts, rivets, welds, or other fastening means known in the art. A liner wall 20 has a hot surface 22 facing away from the support 16 and a cold surface 24 contacting the support 16. The liner wall 20 may be made from a high temperature, cast, forged or sheet material such as Nickel or Cobalt for example. The hot surface 22 may also include one or more layers of thermal barrier coating (TBC) 26, such as a metallic or ceramic material, for improved insulation from the gas path air 12. Thermal gradient lines 28 depict the temperature differential across the hot surface 22 and indicate that a localized hot spot 30 location is present in the area of one of the liners 14. Spallation of the TBC layer 26 is also indicative of the presence of a hot spot 30.

One or more coolant apertures 32 in the support 16 direct a cooling air 34, such as pressurized air bled from the compressor, to the cold surface 24 of the liner. The coolant apertures 32 may be perpendicular to the flow of gas path air 12, as shown, or may be angled to the flow. The cooling air 34 provides convective cooling to reduce the operating temperature of the support 16 as it flows through the coolant apertures 32.

Figure 2:
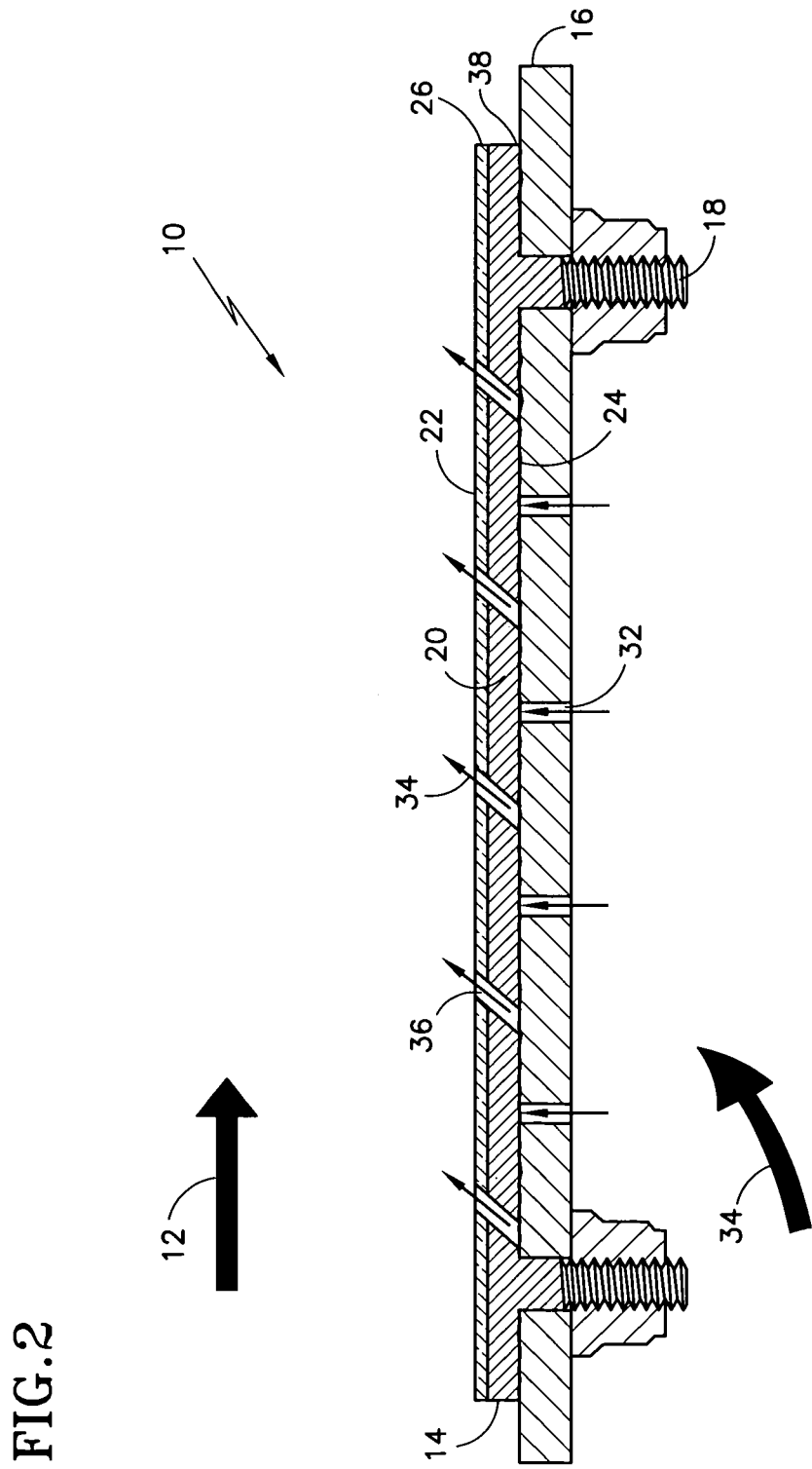
FIG. 2 illustrates a sectional view of the cooled structure taken along line 2-2 of FIG. 1.

Referring now to FIG. 2, the cold surface 24 contacts the support 16 in an average temperature location. The average temperature location is within nominal design parameters, having no hot spots, so impingement cooling of the cold surface 24 with cooling air 34 is unnecessary. The cooling air 34 exits the coolant apertures 32, flows between the liner wall 20 and support 16, and exits through one or more film apertures 36 in the liner wall 20. The film apertures 36 may be angled with the flow of gas path air 12, may be at another angle, or may be perpendicular to the flow. The cold surface 24 is as-cast or otherwise textured to provide a channel 38 or conduit for directing the cooling air 34 exiting the coolant apertures 32. The location of the coolant apertures 32 may be staggered in relation to the film apertures 36, aligned with the film apertures 36 or completely independent of their location. Note that the cooling air 34 does not impinge on the cold surface 24 of the liner wall 20 in this average temperature location; it merely provides for convective cooling by flowing between the liner 14 and support 16.

Figure 3:
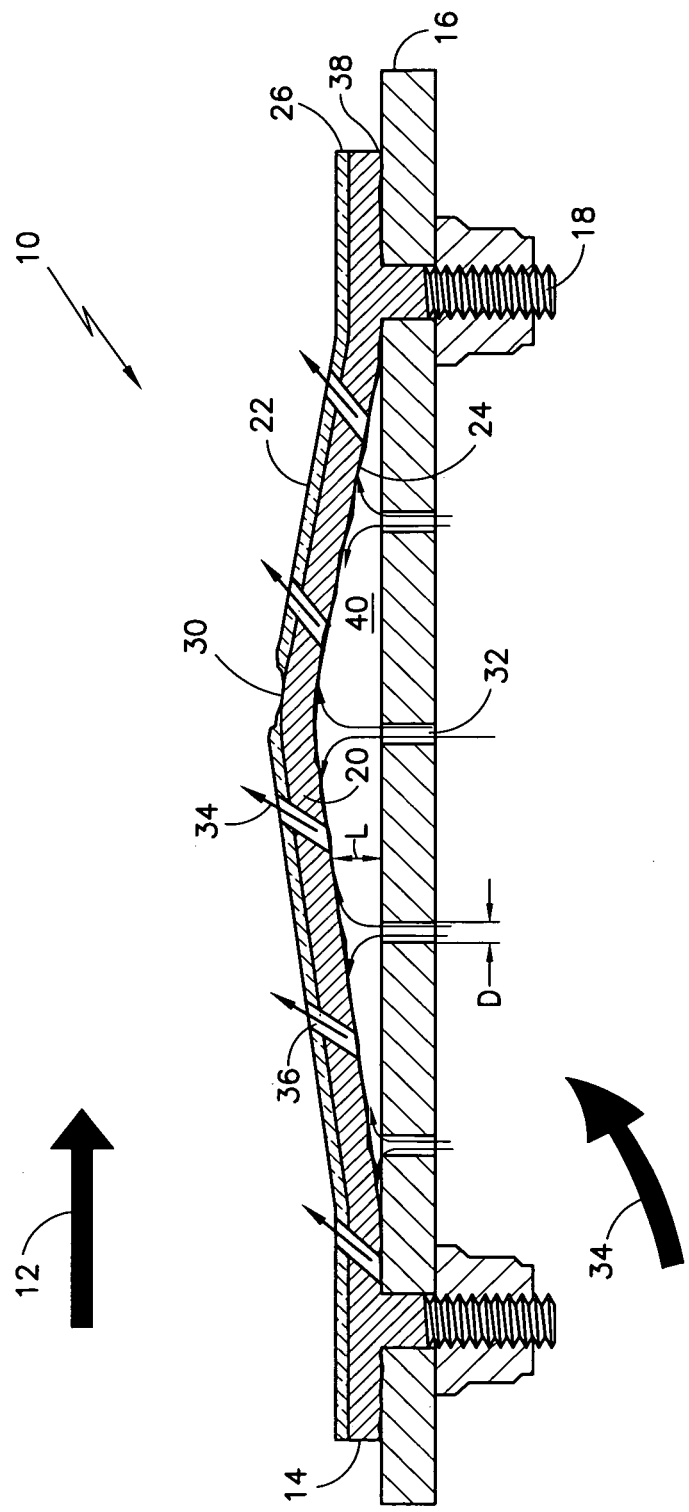
FIG. 3 illustrates a sectional view of the cooled structure taken along line 3-3 of FIG. 1.

Referring now to FIG. 3, the liner wall 20 is buckled from the extreme heat caused by a hot spot 30. The hot spot 30 is exacerbated by an area of spalled TBC. Due to the buckling, the cold surface 24 is now offset a distance (L) from the support 16, forming a chamber 40 therebetween. The cooling air 34 now exits the coolant apertures 32 as jets and impinges on the cold surface 24, before exiting through the one or more film apertures 36. The distance (L) is preferably between approximately one and five times the diameter (D) of the coolant apertures 32. Ideally, the distance (L) is between approximately two and four times the diameter (D) of the coolant apertures 32. Most ideally, the distance (L) is approximately three times the diameter (D) of the coolant apertures 32. Note that the cooling air 34 does impinge on the cold surface 24 of the liner wall 20 in this hot spot location.

Referring lastly to FIG. 4, an alternate embodiment of the liner 14 is shown. Unlike the solid structure of the liners 14 depicted in FIGS. 1-3, the liner 14 of FIG. 4 is made of a porous structure. The porous structure includes a number of pores and may be made of a metallic foam, sintered spheres, or other porous material. Note that the structure allows impingement of the cooling air 34 to occur on the cold surface 24 and a layer of TBC may also be applied to the hot surface 22.

While the present invention has been described in the context of specific embodiments thereof, other alternatives, modifications and variations will become apparent to those skilled in the art having read the foregoing description. Accordingly, it is intended to embrace those alternatives, modifications and variations as fall within the broad scope of the appended claims.

What is claimed is:

1. A structure with adaptive cooling comprising:
    a mounting support having a coolant aperture for directing cooling air through said support; and
    a liner mounted to said support, said liner including a wall having a hot surface facing away from said support and a cold surface facing toward said support, said liner having:
        an average temperature position, wherein said liner wall cold surface contacts said mounting support, said liner wall cold surface defining a channel sufficiently proximate said coolant aperture to permit a convective flow of cooling air from said coolant aperture; and
        a hot temperature position induced by a hot spot location on said liner wall hot surface, wherein said liner wall deflects away from said mounting support to form a chamber between said liner wall cold surface and said mounting support, said chamber having an offset distance from the coolant aperture to the liner wall cold surface sufficient to permit said cooling air to impinge on the cold surface of said liner wall.

2. The structure of claim 1, wherein said liner has a film aperture through the wall and the cooling air passes through the film aperture and exits the hot surface, forming a film.

3. The structure of claim 1, wherein said liner wall is porous and the cooling air passes through the pores and exits the hot surface, forming a film.

4. The structure of claim 3, wherein the channel is defined by a texture on the cold surface of said liner.

5. The structure of claim 2, wherein the liner is mounted to the support with fastening means.

6. The structure of claim 2, wherein the support further comprises an array of coolant apertures and the liner wall further comprises an array of film apertures.

7. The structure of claim 1, wherein the coolant apertures have a diameter D, and said liner wall deflects away from the support a distance L that is between approximately one to five times the value of D, L being defined at a point offset from a maximum deflection point.

8. The structure of claim 7, wherein said liner wall deflects away from the support a distance L that is between approximately two to four times the value of D.

9. The structure of claim 8, wherein said liner wall deflects away from the support a distance L that is approximately three times the value of D.

10. A method of adaptively cooling a liner mounted to a support comprising:
    providing a support having a coolant aperture;
    providing a liner mounted to the support, the liner including a wall having a hot surface facing away from the support and a cold surface facing toward the support, the liner wall cold surface defining a channel;
    introducing cooling air into a coolant aperture in the support;
    directing the cooling air through the coolant aperture and into the channel;
    placing the liner in an average temperature position in which the liner wall cold surface contacts the support, wherein the channel is sufficiently proximate said coolant aperture to permit a convective flow of cooling air from said coolant aperture; and
    deflecting the liner to a hot temperature position in response to a hot spot location on said liner wall hot surface in which the liner wall is spaced from the support to form a chamber between the liner wall cold surface and the support, wherein the chamber has an offset distance from the coolant aperture to the liner wall cold surface sufficient to permit the cooling air to impinge on the liner wall cold surface.

11. The method of claim 10 wherein the coolant aperture has a diameter D, and the deflecting step causes the liner to deflect a distance L that is between approximately one to five times the value of D away from the support, L being defined at a point offset from a maximum deflection point.

12. The method of claim 11 wherein the coolant aperture has a diameter D, and the deflecting step causes the liner to deflect a distance L that is between approximately two to four times the value of D away from the support.

13. The method of claim 11 wherein the coolant aperture has a diameter D, and the deflecting step causes the liner to deflect a distance L that is between approximately three times the value of D away from the support.

14. The method of claim 10 further comprising the step of directing the cooling air into an aperture in the liner.

15. The method of claim 10 further comprising the step of directing the cooling air into pores in the liner.

* * * * *